United States Patent

[11] 3,615,843

| [72] | Inventor | Paul J. Moran |
| | | Ballston Lake, N.Y. |
| [21] | Appl. No. | 756,795 |
| [22] | Filed | Sept. 3, 1968 |
| [45] | Patented | Oct. 26, 1971 |
| [73] | Assignee | General Electric Company |

[54] METHOD OF CHARGING A METAL-AIR CELL
1 Claim, 3 Drawing Figs.

[52] U.S. Cl. ................................................ 136/86
[51] Int. Cl. ........................................... H01m 29/04
[50] Field of Search ....................................... 136/120
   FC, 10, 11; 29/196.6

[56] References Cited
UNITED STATES PATENTS

| 2,969,315 | 1/1961 | Bacon | 136/120 X |
| 3,077,507 | 2/1963 | Kordesch et al. | 136/120 X |
| 3,230,114 | 1/1966 | Friese et al. | 136/120 X |
| 3,248,267 | 4/1966 | Langer et al. | 136/120 X |
| 3,288,653 | 11/1966 | Holt et al. | 136/120 |
| 3,297,484 | 1/1967 | Niedrach | 136/120 X |
| 3,311,508 | 3/1967 | Beddick et al. | 136/120 |
| 3,438,815 | 4/1969 | Giner | 136/120 X |
| 3,364,064 | 1/1968 | Wijburg | 29/196.6 X |

*Primary Examiner*—Allen B. Curtis
*Attorneys*—Richard R. Brainard, Paul A. Frank, Charles T. Watts, Paul R. Webb, II, Frank L. Neuhauser, Oscar B. Waddell and Melvin M. Goldenberg

ABSTRACT: A method of charging a secondary metal-air cell includes providing a composite laminar gas diffusion cathode which as a porous, electrically conductive sheet in electrical contact with the substrate of the cathode, the sheet having a lower oxygen overvoltage than the cathode substrate, positioning the cathode with the sheet facing the anode, and applying a charging current across the electrodes whereby oxygen evolution during charging occurs substantially only at the porous sheet.

INVENTOR:
PAUL J. MORAN,
by Paul R. Webb, II
HIS ATTORNEY

METHOD OF CHARGING A METAL-AIR CELL

This invention relates to composite gas diffusion electrodes and, more particularly, to composite gas diffusion electrodes in which a catalytic material is in contact with an electrically conductive, porous substrate.

The invention described herein was made under Contract No. DAAB-07-67C- 0257 with the Department of the Army.

A secondary metal-air cell is a galvanic cell which uses an oxidant of oxygen, or oxygen from the air as the reactive material consumed at the positive electrode of the cell. The oxygen thereby serves as the cathode depolarizer. Such a cell employs generally an alkaline electrolyte. A gas diffusion cathode is used generally which has an electrically conductive, porous substrate and catalytic material in contact with the substrate. Cadmium and zinc are commonly used anode materials in such cells since they are generally low in cost and light in weight.

However during the charging of such a cell, the porous substrate of the cathode, which includes a metal such as nickel, oxidizes during the evolution of oxygen at this electrode resulting in problems during discharge of electrolyte wetting of the cathode which reduces cathode life, and of elevated voltage at the initiation of discharge which requires separate control equipment to reduce the voltage to its normal condition. My present invention is directed to an improved composite gas diffusion electrode, which is particularly useful in such a metal-air cell as the cathode, and which eliminates the substrate oxidation thereby solving the above problems.

It is a primary object of my invention to provide a composite gas diffusion electrode in which substrate oxidation does not occur during metal-air cell operation thereby extending the electrode life.

In accordance with my invention, a composite gas diffusion electrode comprises an electrically conductive, porous substrate, catalytic material in contact with the substrate, and a porous electrically conductive sheet positioned adjacent one surface of the substrate and in electrical contact therewith.

These and various other objects, features and advantages of the invention will be better understood from the following description taken in connection with the accompanying drawings in which.

Figure 1:
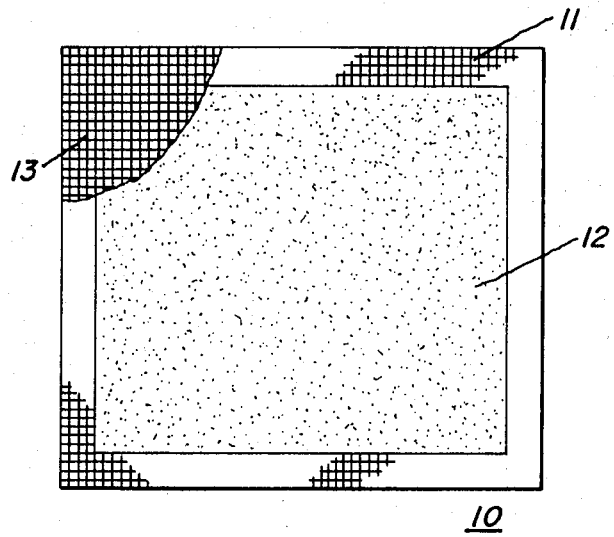
FIG. 1 is an elevational view partially in section of a composite gas diffusion electrode embodying my invention.

In FIG. 1 of the drawing, there is shown generally at 10 a composite gas diffusion electrode embodying my invention. Electrode 10 comprises an electrically conductive, porous substrate 11 which is shown as a sintered nickel plaque, with catalytic material 12, which is shown as platinum particles, and a binder in contact with substrate 11. The platinum particles are bonded together and in substrate 11 by a binder of a suitable material, such as polytetrafluoroethylene. Additionally, the exterior face of the catalytic material 12 may be coated with a thin film of polytetrafluoroethylene to provide waterproofing for the electrode. A porous, electrically conductive sheet 13 is positioned adjacent one surface of substrate 11 and in electrical contact therewith. Sheet 13 is shown in the form of a porous stainless steel screen which has a lower oxygen overvoltage than substrate 11 with catalytic material 12. Sheet 13 can be connected electrically to substrate 11 by attachment in various well-known manners such as welding or by electrical leads.

Figure 2:
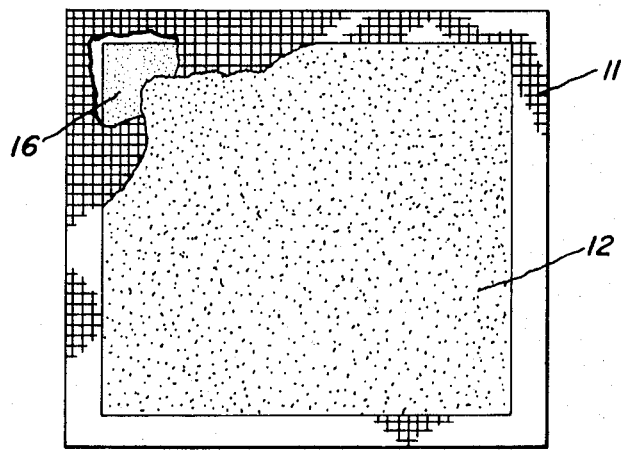
FIG. 2 is an elevational view partially in section of a modified gas diffusion electrode.

In FIG. 2 of the drawing there is shown a modified gas diffusion electrode 15 embodying my invention. Electrode 15 comprises a similar electrically conductive, porous substrate 11 and catalytic material 12 as described above in connection with FIG. 1. A modified porous, electrically conductive sheet 16 is positioned adjacent one surface of substrate 11 and in electrical connection therewith. Sheet 16 is shown in the form of stainless steel metal particles bonded together and to substrate 11 by a suitable material, such as polyvinylidine fluoride. The metal particle sheet has a lower oxygen overvoltage than substrate 11 with catalytic material 12.

I have discovered that an improved gas diffusion electrode can be constructed by employing an electrically conductive, porous substrate, catalytic material in contact with the substrate, and a porous, electrically conductive sheet positioned adjacent one surface of the substrate and in electrical contact therewith. I found that the porous sheet must have a lower oxygen overvoltage than the substrate with catalytic material.

The substrate is usually a metal, such as nickel, or has a metallic coating thereon. The catalytic material is normally a noble metal, such as platinum, bonded in the substrate with a binder. For such an electrode, the porous, electrically conductive sheet can be selected from or coated with metals including iron, cobalt, their respective alloys, steels and stainless steels, since these materials have a lower oxygen overvoltage than nickel. At a current density of 100 milliamperes per square centimeter, the overvoltage values in a 36-percent potassium hydroxide solution of nickel, iron and cobalt in volts to a standard hydrogen reference are 0.92, 0.57 and 0.54 volts, respectively. When the porous sheet is made of or coated with such a lower oxygen overvoltage material and connected electrically to the substrate as described above, the oxygen evolution during cell charging is at the porous sheet in preference to the substrate with the catalytic material. Thus, the substrate with catalytic material is protected from oxidation. During subsequent cell discharge, there is no wetting of this electrode and no elevated voltage at the initiation of the discharge.

The porous, electrically conductive sheet can be formed in a variety of configurations including plaques, screens, wires, punched plate, expanded sheet, porous sheet, etc. Such sheet is connected electrically to the substrate in various satisfactory manners, such as by welding, by electrical lead, etc. Furthermore, I found that such a porous, electrically conductive sheet can be formed from metal particles of the above types which are bonded together and to the substrate by a suitable binder. Suitable binders include polyvinylidine fluoride polytetrafluoroethylene, polyvinyl alcohol, etc.

Figure 3:
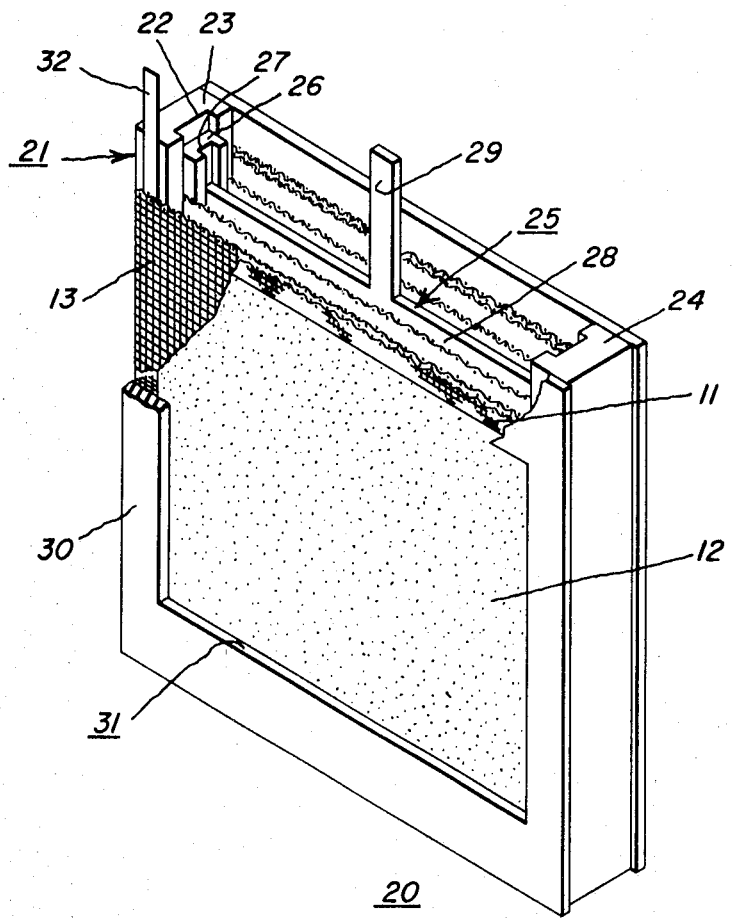
FIG. 3 is a perspective view of a metal-air cell employing an electrode as shown in FIG. 1.

In FIG. 3 of the drawing, there is shown generally at 20 an improved metal-air cell embodying the composite gas diffusion electrode of my invention. Cell 20 has a casing 21 in the form of a U-shaped frame. A vertical groove 22 is provided for each of the opposite frame members 23 and 24. A unit 25, which is positioned in grooves 22 of members 23 and 24 of casing 21, comprises a pair of spaced guides 26, each of which is provided with a vertical groove 27 to receive an edge of a cadmium anode plate 28. A terminal strip 29 is formed integrally with plate 28 and extends upwardly and outwardly from guides 26.

On opposite outer surfaces of casing 21, a gas diffusion electrode 10 from FIG. 1 of the drawing is shown sealed thereto. A face piece 30 is sealed to each of the opposite surfaces of casing 21 and overlies the edges of substrate 11. Each of the face pieces 30 is provided with a large opening 31 whereby each electrode 10 lying within open portion 31 forms the gas-permeable, liquid-impermeable cathode which is coextensive with opening 31. A terminal strip 32 is attached to substrate 11 at its edge to provide an electrical connection for the cathode. Porous sheet 13 faces anodes 28 and will contact the aqueous electrolyte.

I found also an improved method of charging the above secondary metal-air cell which comprises assembling the metal-air cell as described above, and applying a charging current across the anode and cathode. During charging, oxygen evolution occurs at the porous, electrically conductive sheet and not at the substrate thereby protecting the substrate with catalytic material from oxidation with subsequent elimination of electrolyte wetting of the electrode and of elevated voltage upon initial discharge. Additionally, I found further am improved method of generating electrical energy from a secondary metal-air cell comprises assembling the metal-air cell as described above, and applying an electrical load across the anode and cathode.

Examples of composite gas diffusion electrodes made in accordance with my invention are as follows:

EXAMPLES 1-6

Six composite gas diffusion electrodes were prepared for examples 1-6 in accordance with my invention. Each of these electrodes was formed from a sintered nickel plaque substrate which had platinum metal particles bonded together and in the substrate by a polytetrafluoroethylene binder. Examples 1 and 3 had a porous, electrically conductive sheet in the form of a low carbon steel grid connected electrically to one surface of the substrate by welding thereto. Examples 2, 4, 5 and 6 had a stainless steel 316 grid attached in the same manner.

EXAMPLES 7-8

Two gas diffusion electrodes, which were not made in accordance with my invention, were each prepared from a sintered nickel plaque substrate which had platinum metal particles bonded together and in the substrate by a polytetrafluoroethylene binder.

EXAMPLES 9-16

Each of the electrodes from above examples 1-8 was made the cathode in a metal-air cell with a cadmium anode, a 36 percent potassium hydroxide electrolyte in contact with the electrodes, and air supplied to the cathode.

The cathode-oxygen evolution polarization was compared for the metal-air cells of examples 9, 10 and 15 containing electrodes from examples 1, 2 and 7. The results are set forth below in Table I in which voltage of the gas diffusion cathode versus a mercury-mercuric oxide reference electrode in a 36 percent potassium hydroxide solution is plotted against current density in milliamperes per square centimeter.

TABLE I

| Current Density ma./cm.$^2$ | Example No. Voltage (volts) | | |
| --- | --- | --- | --- |
| | 1 | 2 | 7 |
| 5 | −0.54 | −0.55 | −0.63 |
| 10 | −0.56 | −0.57 | −0.64 |
| 20 | −0.58 | −0.59 | −0.67 |
| 30 | −0.61 | −0.62 | −0.70 |
| 40 | −0.63 | −0.64 | −0.73 |
| 60 | −0.66 | −0.67 | −0.75 |

The metal-air cells of examples 11, 12 and 13 containing electrodes from examples 3, 4 and 5 were cycled to a total of ampere hours per square centimeter as set forth below in Table II. Each cycle consisted of 10.8 hours which were divided into open circuit voltage for 0.90 hours, charge of 20 ma./cm.$^2$ for 4.90 hours, open circuit voltage for 0.75 hours, and discharge of 20 ma./cm.$^2$ for 4.20 hours.

TABLE II

| Example No. | No. of Cycles | A. Hrs./cm.$^2$ Total |
| --- | --- | --- |
| 11 | 143 | 26.3 |
| 12 | 191 | 34.8 |
| 13 | 191 | 38.1 |

In the cycling of the above metal-air cells of examples 11, 12 and 13, the oxygen evolution occurred at the porous electrically conductive sheet and not at the substrate thereby protecting the substrate with catalytic material from oxidation.

The metal-air cells of examples 14 and 16, which included the electrodes of examples 6 and 8, respectively, were operated to 16 ampere hours per square centimeter. The results of these cell operations are set forth below in Table III.

TABLE III

| Current Density ma./cm.$^2$ | Example No. Voltage (volts) | |
| --- | --- | --- |
| | 14 | 16 |
| 5 | 0.85 | 0.85 |
| 10 | 0.80 | 0.80 |
| 20 | 0.77 | 0.77 |
| 30 | 0.72 | 0.70 |
| 40 | 0.69 | 0.50 |
| 50 | 0.62 | 0.40 |

EXAMPLES 17-18

Two metal-air cells were assembled as described above for examples 9-16 wherein the cathode for example 17 was made in accordance with examples 1-6 as in my present invention and the cathode for example 18 was made in accordance with examples 7-8 which were not made in accordance with my invention. Each of these cells which was a secondary metal-air cell was charged by applying a current across the anode and cathode thereof. Subsequently, both of these cells were discharged at 20 ma./cm.$^2$. The initial discharge is set forth below in Table IV wherein the cell voltage of each of the cells 17 and 18 is plotted against discharge time in seconds.

TABLE IV

| Time Seconds | Example No. Voltage (volts) | |
| --- | --- | --- |
| | 17 | 18 |
| 0 | 0.78 | 1.29 |
| 7.5 | 0.78 | 1.22 |
| 35.0 | 0.77 | 1.20 |
| 43.0 | 0.77 | 1.10 |
| 45.0 | 0.77 | 0.77 |
| 75.0 | 0.76 | 0.76 |

The generation of electrical energy from a secondary metal-air cell employing a composite gas diffusion electrode made in accordance with my invention is shown wherein the metal-air cell is maintained on open circuit for a period of time preferably one hour prior to the commencement of discharge of the cell. The metal-air cells of the above examples 17 and 18 were charged at 20 milliamperes per square centimeter for a total of 4.90 hours. After this charge, both cells were maintained on open circuit voltage for 1.0 hour prior to discharging these cells at 20 milliamperes per square centimeter. The effect of maintaining these cells on open circuit voltage prior to discharge is shown below in table V, wherein the decrease in cell voltage is shown for both cells plotted against time in minutes.

TABLE V

| Time Minutes | Example No. Voltage (volts) | |
| --- | --- | --- |
| | 17 | 18 |
| 0 | 1.5 | 1.5 |
| 15 | 1.32 | 1.46 |
| 40 | 1.25 | 1.42 |
| 45 | 0.99 | 1.41 |
| 60 | 0.95 | 1.39 |

EXAMPLE 19

A composite gas diffusion electrode was prepared for example 19 in accordance with my invention. This electrode was formed from a sintered nickel plaque substrate which had platinum metal particles bonded together and in the substrate by polytetrafluoroethylene binder. The porous, electrically conductive sheet for this electrode was formed from −325 mesh-type 302 stainless steel powder which was mixed with a binder of 2 weight percent polyvinylidine fluoride in a solvent of dimethylacetamide. The metal particles were bonded together by this binder which was painted on the electrolyte side of the substrate thereby being in electrical contact therewith. A composite structure was then dried and sintered at 200° C. for 10 minutes to form the composite electrode of this example.

The cathode-oxygen evolution polarization was obtained for a metal-air cell as described above in examples 9–16 which include the electrode of this example as the cathode. The result of this test is set forth below in Table VI in which voltage of the gas diffusion cathode versus a mercury-mercuric oxide reference electrode in a 36 percent potassium hydroxide solution is plotted against current density in milliamperes per square centimeter.

TABLE VI

| Current Density ma./cm.² | Example No. Voltage (volts) 19 |
| --- | --- |
| 5 | −0.53 |
| 10 | −0.54 |
| 20 | −0.57 |
| 30 | −0.59 |
| 40 | −0.61 |
| 50 | −0.63 |

The successful operation of the metal-air cell from this example incorporating a gas diffusion cathode of my invention is set forth also in Table VII wherein cell voltage in volts is plotted against current density during the operation of this cell.

TABLE VII

| Current Density ma./cm.² | Example no. Voltage (volts) 19 |
| --- | --- |
| 5 | 0.85 |
| 10 | 0.80 |
| 20 | 0.71 |
| 30 | 0.64 |
| 40 | 0.57 |
| 50 | 0.48 |

The metal-air cell of this example was also cycled for 60 cycles in the same manner as set forth above in examples 9–16. The oxygen evolution occurred at the porous electrically conductive sheet and not at the substrate thereby protecting the substrate with catalytic material from oxidation.

While other modifications of the invention and variations thereof which may be employed within the scope of the invention have not been described, the invention is intended to include such as may be embraced within the following claim:

What I claim as new and desire to secure by letters patent of the United States is:

1. A method of charging a secondary metal-air cell comprising at least one anode, providing an alkaline electrolyte in contact with the anode, providing a composite laminar gas diffusion cathode comprising an electrically conductive porous substrate catalytic material in contact with the substrate, and a porous, electrically conductive sheet in electrical contact with the substrate, the porous sheet having a lower oxygen overvoltage than the substrate with catalytic material, positioning the composite cathode in contact with the electrolyte and spaced from the anode with the conductive sheet facing the anode, and applying a charging current across the anode and cathode whereby oxygen evolution during charging occurs substantially only at the porous sheet.

* * * * *